United States Patent [19]
Schmidt et al.

[11] 3,839,009

[45] Oct. 1, 1974

[54] HERBICIDAL COMPOSITIONS

[75] Inventors: Robert R. Schmidt, Koeln; Gerhard Jager, Wuppertal-Elberfeld, both of Germany

[73] Assignee: Bayer Aktiengesellschaft, Leverkusen, Germany

[22] Filed: June 28, 1972

[21] Appl. No.: 266,877

[30] Foreign Application Priority Data
July 1, 1971   Germany............................ 2132764

[52] U.S. Cl.................... 71/92, 260/260, 260/309.7
[51] Int. Cl.............................................. A01n 9/22
[58] Field of Search.................................. 71/92, 90

[56] References Cited
FOREIGN PATENTS OR APPLICATIONS
737,449    0/0000   Belgium 1,923,825    1/1971   Germany................................ 71/92

*Primary Examiner*—James O. Thomas, Jr.
*Attorney, Agent, or Firm*—Burgess, Dinklage & Sprung

[57] ABSTRACT

Herbicidal compositions containing as active ingredients 1. imidazolidin-2-one-1-carboxylic acid isobutylamide and 2. 3-cyclohexyl-5,6-trimethylene-6-hydroxy-5,6-dihydro-uracil are synergistically effective as herbicides particularly as selective herbicides for use in beet cultivations.

5 Claims, No Drawings

HERBICIDAL COMPOSITIONS

The present invention relates to a new herbicidal synergistic combination of two specific active compounds. One of these is the known imidazolidin-2-one-1-carboxylic acid isobutylamide. The other is a new compound, 3-cyclohexyl-5,6-trimethylene-6-hydroxy-5,6-dihydro-uracil. The combination displays a particularly good herbicidal activity for the selective combating of weeds in beet cultivations.

It has already been disclosed that imidazolidin-2-one-1-carboxylic acid isobutylamide can be used as a selective herbicide in beets (compare Belgian Patent Specification 737,449). It is furthermore known that 3-cyclohexyl-5,6-trimethylene-uracil can be employed, depending on the amount used, as a total herbicide or as a selective herbicide in beets, spinach, strawberries and citrus fruits (compare U.S. Pat. Nos. 3,005,015, 3,235,357, 3,235,360, 3,235,361, 3,235,362, 3,235,363, 3,352,863 and 3,360,521). It is furthermore known that a combination of active compounds, of imidazolidin-2-one-1-carboxylic acid isopropylamide and 3-cyclohexyl-5,6-trimethylene-uracil is suitable for the selective combating of weeds in beets (compare German Offenlegungsschrift (German Published Specification) 1,932,825). However, the selective herbicidal action of all the compounds and the combination mentioned in this paragraph is not always entirely satisfactory for combating weeds in beets, especially if desirably low amounts and concentrations are employed.

The present invention provides a synergistic herbicidal composition containing as active ingredients
1. imidazolidin-2-one-1-carboxylic acid isobutylamide of the formula

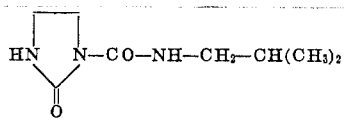

and
2. 3-cyclohexyl-5,6-trimethylene-6-hydroxy-5,6-dihydrouracil of the formula

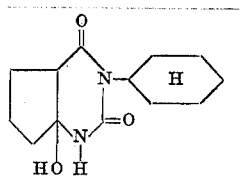

alone or in admixture with a solid or liquid or liquefied gaseous diluent or carrier.

The invention also provides a method of selectively combating weeds in an area of beet cultivation which comprises applying to the area a composition according to the invention.

This method also provides beet crops protected from damage by weeds by being grown in an area in which a composition according to the invention was applied during or immediately before the growing.

Surprisingly, the activity of the active compound combination according to the invention is substantially higher than the sum of the activities of the individual active compounds. An unforeseeable genuine synergistic effect manifests itself, and not merely a supplementation of the activity. This synergistic effect manifests itself particularly strongly in certain ranges of proportions, which are mentioned below.

The herbicidal activity of the active compound combination according to the invention is substantially higher than that of the known active compound combination of imidazolidin-2-one-1-carboxylic acid isopropylamide and 3-cyclohexyl-5,6-trimethylene-uracil. Furthermore, the active compound combination according to the invention offers the advantage, over the known combination, of better toleration by beet crop plants. The active compound combination according to the invention hence represents a valuable enrichment of the field of beet herbicides.

Imidazolidin-2-one-1-carboxylic acid isobutylamide of the formula (I) is known (compare Belgian Patent Specification 737,449).

3-cyclohexyl-5,6-trimethylene-6-hydroxy-5,6-dihydro-uracil of the formula (II) has hitherto not been known; it can be prepared in a simple manner, for example as follows:

1,043 g (4.47 mols) of 3-cyclohexyl-2,3,4,5,6,7-hexahydrocyclopenta[e]-1,3-oxazine-2,4-dione are introduced over the course of 30 minutes into 3,000 ml of ammonia and the mixture is thereafter stirred for a further 2 hours with external cooling. The ammonia is then displaced by dropwise addition of 2,000 ml of dry ether. The ether-insoluble precipitate is filtered off and dried in vacuo at room temperature, and 1,017 g (90 percent of theory) of 3-cyclohexyl-5,6-trimethylene-6-hydroxy-5,6-dihydro-uracil of melting point 145°C (decomposition) are obtained.

The oxazinedione required as the starting material can be prepared as follows:

A solution of 168.2 g (1 mol) of 2,2-dimethyl-cyclopenta[e]-1,3-dioxin-4-one in 300 ml of xylene is added dropwise over the course of 1½ hours to a solution of 187.8 g (1.5 mols) of cyclohexylisocyanate in 250 ml of xylene, heated to 140°C. The acetone formed in the reaction is continuously distilled off and thus removed from the reaction mixture. Thereafter the solvent is distilled off under reduced pressure and the residue is distilled in vacuo. 166.3 g (70 percent of theory) of 3-cyclohexyl-2,3,4,5,6,7-hexahydro-cyclopenta[e]-1,3-oxazine-2,4-dione of boiling point 164° – 165°C/0.5 mm are obtained; the material solidifies to form crystals and then melts at 70° – 71°C.

The preferred active compound combination according to the invention generally contains the components of the formulae (I) and (II) in a weight ratio of from 1.5 : 1 to 9 : 1, preferably 3 : 1 to 5 : 1. The combination of imidazolidin-2-one-1-carboxylic acid isobutylamide and 3-cyclohexyl-5,6-trimethylene-6-hydroxy-5,6-dihydro-uracil in the ratio of approximately 5 : 1 is very particularly preferred.

The active compound combination according to the invention can display a very good action against weeds without damaging the beets. When used in larger amounts (>25 kg/ha), the active compound combination according to the invention is also suitable as a total herbicide.

By weeds in the broadest sense there are to be understood plants which are normally found as a contaminants in beet cultivation, for example fodder beet cultivation and sugar beet cultivation.

As examples of weeds which can be destroyed by the composition of the invention and which frequently occur in beet cultivation, there may be mentioned: dicotyledons, for example common persicaria (*Polygonum persicaria*), deadnettle (*Lamium spec.*), chickweed (*Stellaria media*), fat hen (*Chenopodium album*) and ivy-leaved speedwell (*Veronica hederifolia*), and monocotyledons, for example annual bluegrass (*Poa annua*) and blackgrass (*Alopecurus myosuroides*).

The active compounds according to the present invention can be converted into the usual formulations, such as solutions, emulsions, suspensions, powders, pastes and granulates. These may be produced in known manner, for example by mixing the active compounds with extenders, that is, liquid or solid or liquefied gaseous diluents or carriers, optionally with the use of surface-active agents, that is, emulsifying agents and/or dispersing agents. In the case of the use of water as an extender, organic solvents can, for example, also be used as auxiliary solvents.

As liquid diluents or carriers, there are preferably used aromatic hydrocarbons, such as xylenes, toluene, benzene or alkyl naphthalenes, chlorinated aromatic or aliphatic hydrocarbons, such as chlorobenzenes, chloroethylenes or methylene chloride, aliphatic hydrocarbons, such as cyclohexane or paraffins, for example mineral oil fractions, alcohols, such as butanol or glycol as well as their ethers and esters, ketones, such as acetone, methyl ethyl ketone, methyl isobutyl ketone or cyclohexanone, or strongly polar solvents, such as dimethyl formamide, dimethyl sulphoxide or acetonitrile, as well as water.

By liquefied gaseous diluents or carriers are meant liquids which would be gaseous at normal temperatures and pressures, e.g., aerosol propellants, such as halogenated hydrocarbons, e.g., freon.

As solid diluents or carriers, there are preferably used ground natural minerals, such as kaolins, clays, talc, chalk, quartz, attapulgite, montmorillonite or diatomaceous earth, or ground synthetic minerals, such as highly-dispersed silicic acid, alumina or silicates.

Preferred examples of emulsifying agents include non-ionic and anionic emulsifiers, such as polyoxyethylene-fatty acid esters, polyoxyethylene-fatty alcohol ethers, for example alkylarylpolyglycol ethers, alkyl suphonates, alkyl sulphates and arylsulphonates; and preferred examples of dispersing agents include lignin, sulphite waste liquors and methyl cellulose.

The combination of active compounds of the invention may be used mixed with other active substances.

The compositions often contain, from 0.1 to 95, preferably 0.5 to 90, percent by weight of total active compounds.

The active compound combination can be employed as such or in the form of its formulations or the application forms prepared therefrom, such as ready-to-use solutions, emulsions, suspensions, powders, pastes and granules. They may be applied in the customary manner, for example by dusting, atomising, spraying, watering and scattering.

The amounts applied of the active compound combination according to the invention can vary over a certain range. In general, the amounts applied are from 0.5 to 10 kg, preferably 1 to 7.5 kg, of total active ingredients per hectare.

The active compound combination according to the invention is preferably applied before emergence of the plants, but can also be applied after emergence of the plants.

The good herbicidal action of the active compound combination can be seen from the Examples which follow. Whilst the individual active compounds show weaknesses in herbidical action, the combination shows a very broad action against weeds, which exceeds a simple sum of the action.

A synergistic effect exists in herbicides in all cases where the herbicidal action of the active compound combination is greater than that of the individually applied active compounds.

The action to be expected for a given combination of two herbicides can be computed as follows (compare COLBY, S.R., "Calculating Synergistic and Antagonistic Responses of Herbicide Combinations", Weeds 15, pages 20–22, 1967):

If $X$ = percent damage by herbicide A if $p$ kg/ha are used and $Y$ = percent damage by herbicide B if $q$ kg/ha are used and $E$ = the expected damage from herbicides A + B if $p + q$ kg/ha are used, then $E = X + Y - (X \cdot Y/100)$ (see Colby, supra, for derivation of said formula)

If the actual damage is greater than calculated, the action of the combination is "super-additive," that is to say a synergistic effect exists.

The tables of Example A, infra, clearly show that the observed herbicidal action of the active compound combination according to the invention against weeds is greater than the calculated action, that is to say a genuine synergistic effect is present.

The tables furthermore show that the herbicidal activity of the active compound combination according to the invention is greater, and the toleration by beets (Beta) is better, than in the case of the previously known active compound combination consisting of the active compounds (III) and (IV) in the weight ratio of 5:1.

EXAMPLE A

Pre-emergence test
Solvent: 5 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is then diluted with water to the desired concentration.

Seeds of the test plants are sown in normal soil and, after 24 hours, watered with the preparation of the active compound. It is expedient to keep constant the amount of water per unit area. The concentration of the active compound in the preparation is of no importance, only the amount of active compound applied per unit area being decisive. After 3 weeks, the degree of damage to the test plants is determined and characterized by the values 0 – 100, which have the following meaning:

0 : no effect (= control experiment)
50 : 50 percent damage or inhibition of growth
100 : 100 percent damage, i.e., plant totally dead.

The active compounds, the amounts applied and the results can be seen from the following Tables 1 and 2.

TABLE 1
Pre-emergence test

| Active compound | | Amount of active compound used, kg./ha. | Beets (Beta) | Galinsoga | Urtica | Stellaria | Matricaria | Iolium |
|---|---|---|---|---|---|---|---|---|
| 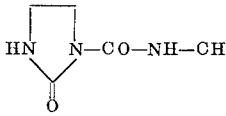 | (I) | 6.25<br>4.17<br>2.085 | 0<br>0<br>0 | 100<br>100<br>60 | 90<br>80<br>60 | 80<br>60<br>60 | 80<br>70<br>40 | 70<br>60<br>50 |
| (known). | | | | | | | | |
| 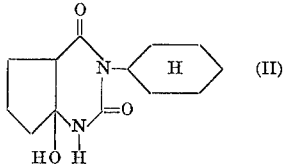 | (II) | 1.25<br>0.83<br>0.415 | 0<br>0<br>0 | 80<br>60<br>30 | 90<br>70<br>20 | 90<br>80<br>40 | 80<br>80<br>20 | 90<br>80<br>50 |
| (new). | | | | | | | | |
| 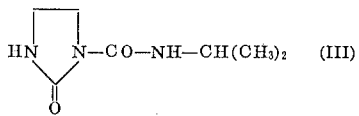 | (III) | 6.25+1.25<br>4.17+0.83<br>2.085+0.415 | 10<br>10<br>0 | 100<br>90<br>90 | 90<br>90<br>80 | 90<br>80<br>80 | 90<br>90<br>80 | 90<br>80<br>70 |
| (plus). | | | | | | | | |
| 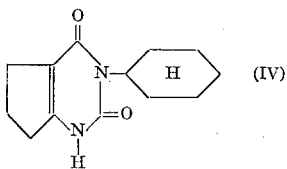 | (IV) | | | | | | | |
| (known) 5:1. | | | | | | | | |

TABLE 2
Pre-emergence test

| Active compound | Amount of active compound used, kg./ha. | Beets (Beta) | | Galinsoga | | Urtica | | Stellaria | | Matricaria | | Lolium | |
|---|---|---|---|---|---|---|---|---|---|---|---|---|---|
| | | Found | Calc. | Found | Calc. | Found | Calc. | Found | Calc. | Found | Calc. | Found | Calc. |
| (I)+(II) 5:1* | 6.25+1.25<br>4.17+0.83<br>2.085+0.415 | 0<br>0<br>0 | 0<br>0<br>0 | 100<br>100<br>100 | 100<br>100<br>72 | 100<br>100<br>100 | 99<br>96<br>68 | 100<br>100<br>100 | 98<br>92<br>70 | 100<br>100<br>100 | 96<br>94<br>52 | 100<br>100<br>90 | 97<br>92<br>75 |

*According to the invention.

It will be understood that the specification and examples are illustrative but not limitative of the present invention and that other embodiments within the spirit and scope of the invention will suggest themselves to those skilled in the art.

What is claimed is:

1. Herbicidal composition containing as active ingredients herbicidally effective amounts of
   1. imidazolidin-2-one-1-carboxylic acid isobutylamide and
   2. 3-cyclohexyl-5,6-trimethylene-6-hydroxy-5,6-dihydro-uracil in a ratio of from 3:1 to 5:1 of component (1) to component (2).

2. A herbicidal composition as claimed in claim 1 in which the ratio is approximately 5:1.

3. Composition as claimed in claim 1 comprising from 0.1 to 95 percent of total active ingredients by weight and comprising a herbicidally acceptable carrier.

4. A method of selectively combating weeds in an area of beet cultivation which comprises applying to the area a composition as claimed in claim 1.

5. Method as claimed in claim 4 in which the active ingredients are applied in an amount of 0.5 to 10 kg of total active ingredients per hectare.

* * * * *